United States Patent [19]

Belvederi et al.

[11] Patent Number: 5,404,889
[45] Date of Patent: Apr. 11, 1995

[54] DEVICE FOR PERFORATING CIGARETTE WRAPPING MATERIAL BY MEANS OF AT LEAST ONE LASER BEAM

[75] Inventors: Bruno Belvederi, S. Martino di Monte S. Pietro; Giulio Barbieri, Anzola Emilia, both of Italy

[73] Assignee: G.D Societa' per Azioni, Bologna, Italy

[21] Appl. No.: 948,172

[22] Filed: Sep. 21, 1992

[30] Foreign Application Priority Data

Sep. 25, 1991 [IT] Italy ............... BO91A0344

[51] Int. Cl.⁶ .................... A24C 5/00; B23K 26/00
[52] U.S. Cl. ........................... 131/281; 219/121.7
[58] Field of Search ............ 131/281; 219/121.7, 219/121.71

[56] References Cited

U.S. PATENT DOCUMENTS

| | | | |
|---|---|---|---|
| Re. 31,478 | 12/1983 | McArthur | 219/121.7 |
| 4,032,743 | 6/1977 | Erbach et al. | |
| 4,281,670 | 8/1981 | Heitmann et al. | 131/281 |
| 4,302,654 | 11/1981 | Bennett et al. | |
| 4,378,480 | 3/1983 | Langhans | 219/121.7 |
| 4,404,454 | 9/1983 | Taylor et al. | 219/121.7 |
| 4,500,770 | 2/1985 | Vock et al. | 131/281 |
| 4,507,535 | 3/1985 | Bennett et al. | |
| 4,767,909 | 8/1988 | Okumoto | 131/281 |
| 5,210,390 | 5/1993 | Okumoto | 131/281 |

Primary Examiner—Mark S. Graham
Attorney, Agent, or Firm—Marshall, O'Toole, Gerstein, Murray & Borun

[57] ABSTRACT

A device for perforating cigarette wrapping material by means of at least one-laser beam, whereby the wrapping material, in the form of a strip, is fed past a focusing head which is supplied with a pulsed laser beam by a laser source and focuses it on to the strip by moving the focused beam in a plane slanting in relation to the traveling direction of the strip; a shutter element, made of material impervious to the laser beam, being used for intercepting and restricting the focused beam to a sector of given shape and size, and so preventing the beam from impinging on given portions of the strip.

7 Claims, 2 Drawing Sheets

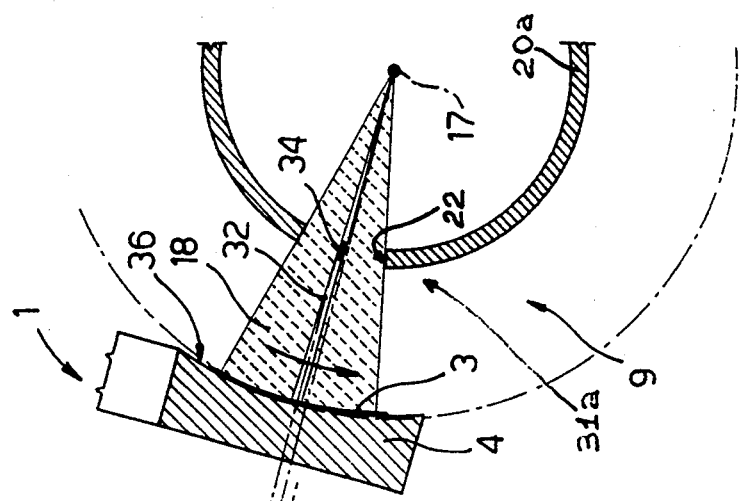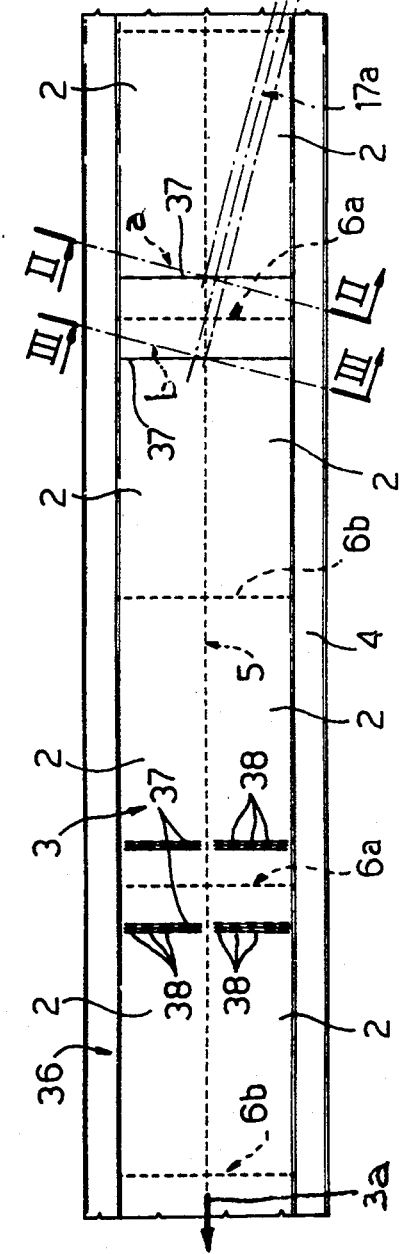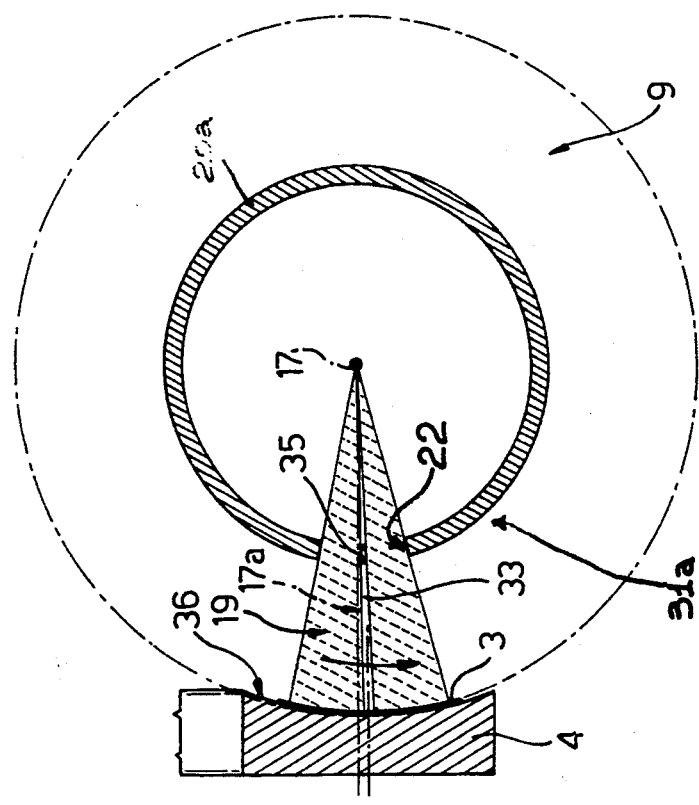
Fig. 2
Fig. 3

DEVICE FOR PERFORATING CIGARETTE WRAPPING MATERIAL BY MEANS OF AT LEAST ONE LASER BEAM

BACKGROUND OF THE INVENTION

The present invention relates to a device for perforating cigarette wrapping material by means of at least one laser beam.

In the cigarette industry, ventilated cigarettes are produced, normally consisting of a filter-tip cigarette, the cover band of the filter of which presents ventilation holes formed by means of a laser beam perforating device, for enabling the smoker to inhale, together with the smoke produced by combustion of the tobacco, a certain amount of air for reducing both the temperature and the amount of harmful substances contained in the smoke.

The formation, by means of laser beams, of ventilation holes for enabling the circulation of cooling air inside the cigarette is also useful in the case of plain cigarettes, i.e. without filters, in which case, the holes must be formed through a portion of the paper wrapping close to the mouth-held portion of the cigarette. Using a laser beam perforating device, however, plain cigarettes, unlike filter-tip types, do not permit formation of the ventilation holes on the finished cigarette, in which case, perforation of the paper wrapping would result in carbonization of the underlying tobacco.

The same also applies to filter-tip cigarettes featuring additional ventilation holes upstream from the filter, i.e. formed through a portion of the paper wrapping.

In the cigarette industry, the above problem is overcome, as described for example in U.S. Pat. No. 4,336,812, by forming the ventilation holes, using the laser method, in the paper wrapping prior to forming the cigarettes.

Such a method, however, involves several drawbacks as regards distribution of the holes in the paper wrapping, which, prior to forming the cigarettes, is normally in the form a continuous paper strip for producing a continuous cigarette rod. The formation of ventilation holes too close to the lateral edges of the paper strip, in fact, may result at later stages in transverse tearing of the strip.

SUMMARY OF THE INVENTION

It is an object of the present invention to provide a straightforward device for effectively perforating cigarette wrapping material using a laser beam, and which provides for overcoming the above drawback.

According to the present invention, there is provided a device for perforating cigarette wrapping material using at least one laser beam, said device comprising a source for emitting at least one pulsed laser beam; supporting means defining a path along which the wrapping material, in the form of a continuous strip, is fed at a predetermined speed and in a predetermined direction; and a focusing head for receiving said pulsed laser beam from said source and focusing it on to said strip; characterized by the fact that the focusing head comprises movable focusing means for focusing the laser beam in at least one plane intersecting said path along a line slanting in relation to the traveling direction of the strip; drive means connected to said focusing means, for moving the beam in said plane; and shutter mean for enabling the beam to sweep, in said plane, over a sector of predetermined shape and size and extending over a given portion of said line.

The present invention also relates to a method of perforating cigarette wrapping material using a laser beam.

According to the present invention, there is provided a method of perforating cigarette wrapping material by means of at least one laser beam, the wrapping material being in the form of a continuous strip fed along a path, defined by means supporting the strip, at a given speed and in a given direction; characterized by the fact that it comprises stages consisting in feeding the strip past a focusing head supplied by a laser beam source with a pulsed laser beam; focusing the laser beam, via movable focusing means on the focusing head, on to the strip on said supporting means and in a plane intersecting said path along a line slanting in relation to the traveling direction of the strip; moving said focusing means for moving the beam in said plane; and employing shutter means for intercepting said beam and enabling it to sweep, in said plane, over a sector of given shape and size and extending over a given portion of said line.

The perforating device described above may be fitted as an accessory and at relatively low cost to a normal cigarette manufacturing machine, for safely perforating the wrapping material of each cigarette with no risk of damaging the tobacco, and upstream from the machine portion by which the continuous paper and tobacco rod is formed.

The possibility of accurately defining the strip portions on which the laser beam is focused prevents the formation of holes which may jeopardize the cigarettes at the forming or cutting stage; and also provides, using the same unit, for perforating both plain cigarettes and the portion adjacent to the filter on filter-tip cigarettes.

BRIEF DESCRIPTION OF THE DRAWINGS

A non-limiting embodiment of the present invention will be described by way of example with reference to the accompanying drawings, in which:

FIG. 2 shows a schematic operating diagram of the FIG. 1 device, the sectioned portion of which illustrates operation along section line II—II;

FIG. 3 shows a schematic operating diagram of the FIG. 1 device relative to section line III—III in FIG. 2.

DETAILED DESCRIPTION OF THE INVENTION

Figure 1:
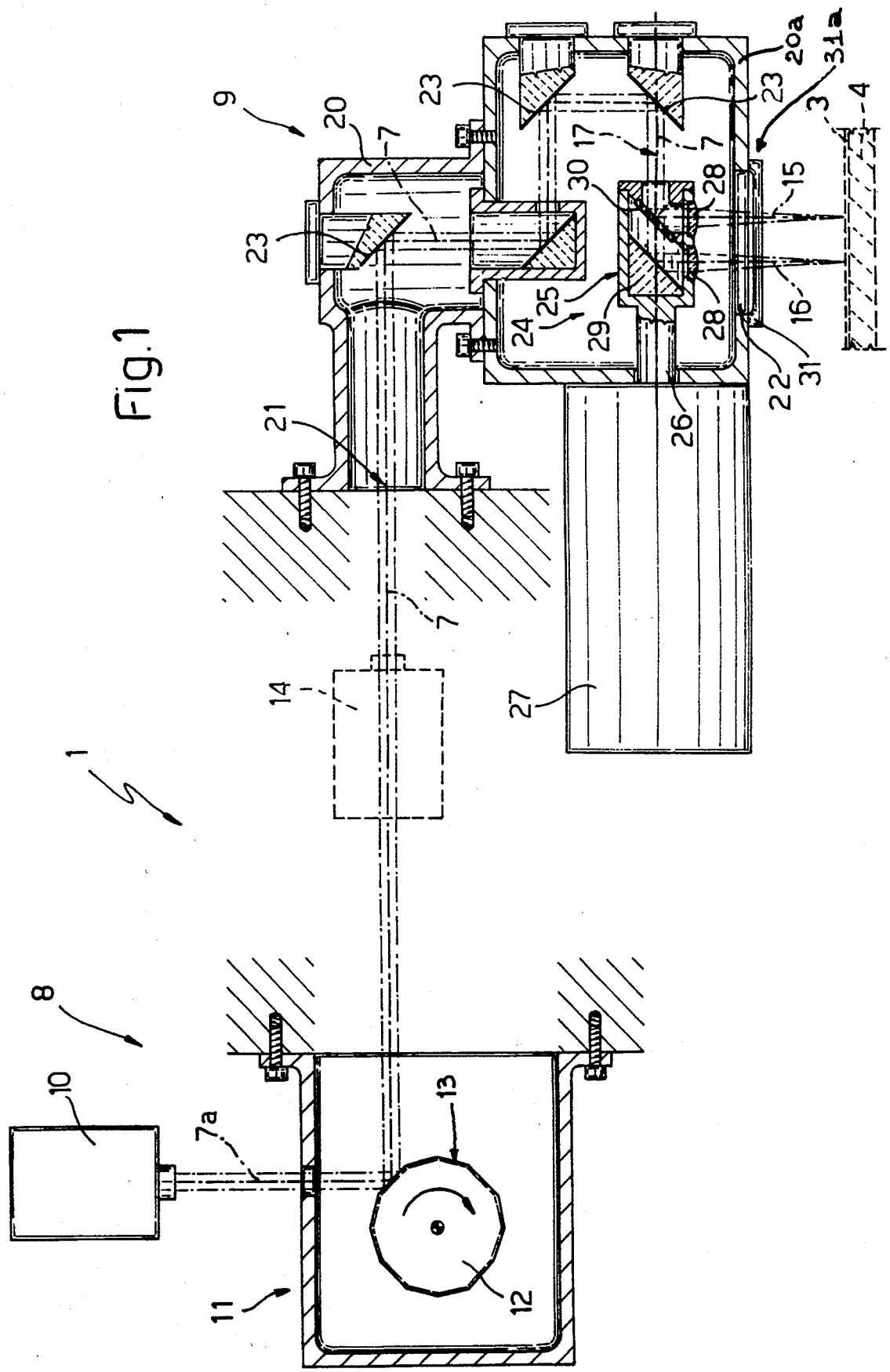
FIG. 1 shows a schematic cross section of a preferred embodiment of the perforating device according to the present invention.

Number 1 in FIGS. 1 and 2 indicates a device for perforating sheets 2 of cigarette wrapping material.

Sheets 2 are formed from a continuous strip 3 traveling in the direction of arrow 3a (FIG. 2) at a given speed along a supporting plate 4.

In the example shown, plate 4 is a supporting and guide plate mounted on a dual-rod cigarette manufacturing machine of the type described and illustrated in U.S. Pat. No. 4,336,812 to which full reference is made herein in the interest of full disclosure. Plate 4 is located immediately upstream from a known cutting station (not shown), where strip 3 is cut longitudinally into two identical strips (not shown), and from a double forming beam (not shown) along which each strip i s folded transversely about a respective stream of shredded tobacco (not shown) to form a respective continuous cigarette rod (not shown) which is later cut transversely into portions (not shown) of the same length.

Strip 3 consists of two rows of sheets 2 joined laterally along the longitudinal center line 5 (dotted line) of strip 3; each row comprising pairs of identical sheets 2 joined end to end along respective lines 6a (dotted line) perpendicular to strip 3; and the pairs of sheets 2 in each row being joined to the adjacent pair along respective transverse lines 6b (dotted line).

In addition to plate 4, device 1 also comprises a source 8 for emitting at least one pulsed laser beam 7; and a focusing head 9 for receiving the pulsed laser beam 7 from source 8 and focusing it on to sheets 2.

Here and hereinafter, the term "pulsed laser beam" is intended to mean a discontinuous laser beam emitted at predetermined time intervals and according to a predetermined frequency. In the example shown, source 8 of such a beam comprises a known emitter 10 for emitting a continuous laser beam 7a of given power and intensity; and a known mechanical chopper 11 comprising a prism 12 rotating clockwise (in FIG. 1) at a given speed and having mirrored lateral faces 13, which, by reflection and by virtue of the rotation of prism 12, convert continuous beam 7a into pulsed beam 7.

By way of alternative, in place of emitter 10 and mechanical chopper 11, source 8 may present an emitter 14 (as shown by the dotted line in FIG. 1) having a known internal electronic chopper circuit supplied with a.c. current at mains frequency (e.g. 50 Hz) for directly generating pulsed laser beam 7 at mains frequency.

Focusing head 9 is designed to focus pulsed laser beam 7 in at least one plane slanting in relation to the traveling direction of strip 3, and to move beam 7 about a given axis within said plane.

With reference also to FIG. 3, focusing head 9 is designed to focus on to strip 3 two parallel pulsed laser beams 15 and 16 obtained by dividing beam 7 into two parts, and to rotate beams 15, 16 about a common axis 17 in respective first and second planes "a" and "b" as shown by II—II and III—III in FIG. 2.

Planes "a" and "b" are parallel to each other and perpendicular to plate 4, intersect plate 4 along respective lines slanting in relation to the direction of arrow 3a, and are separated by a predetermined distance in the direction of arrow 3a.

As explained in more detail later on, each beam 15, 16 may be focused on to strip 3 at any point along a portion of the respective line of intersection lying within a respective sector 18 in plane "a" (beam 15) and sector 19 in plane "b" (beam 16) as shown by the hatched portions in FIGS. 2 and 3. Axis 17 slants in relation to plate 4, and, more specifically, is positioned as shown by line 17a in FIGS. 2 and 3.

Focusing head 9 is positioned facing plate 4, and comprises a fixed casing 20 made of material impervious to the laser beam and having an inlet 21 for laser beam 7. Casing 20 presents a substantially cylindrical lateral wall 20a extending about axis 17 and having a through opening 22 facing strip 3 and extending about axis 17 over an angle equal to that of sectors 18 and 19. Focusing head 9 also comprises a series of deflecting mirrors 23 for receiving pulsed laser beam 7 through inlet 21 and directing it towards opening 22 so that it is eventually coaxial with axis 17.

Focusing head 9 also comprises a powered focusing device 24 housed inside casing 20, facing opening 22, so as to rotate about axis 17, and in turn comprising a cup-shaped rotary element 25 connected integral with the free end of the output shaft 26 of a motor 27 and projecting inside casing 20,, coaxial with axis 17. A lateral wall of element 25 is fitted through with two side by side focusing lenses 28 perpendicular to axis 17, a first of which receives a first part of beam 7 reflected by a splitter element 30 consisting in known manner of a semitransparent mirror for producing focused beam 15, and a second of which receives the second part of beam 7 reflected by a deflecting mirror 29 aligned with splitter element or mirror 30 along axis 17, for producing focused beam 16 of the same intensity as beam 15.

Device 1 also comprises a screen 31 made of material impervious to the laser beam and defined by a crosspiece supported on wall 20a and extending across opening 22 parallel to axis 17, for intercepting, via respective portions 34 and 35, beams 15, 16 along respective portions 32, 33 of sectors 18, 19. Portions 32, 33 present a predetermined angle as shown in FIGS. 2 and 3.

Screen 31 thus cooperates with wall 20a (shown schematically in FIGS. 2 and 3 as a cylindrical annular wall coaxial with axis 17) to define a shutter element 31a for intercepting and preventing beams 15 and 16 from impinging on given portions of strip 3. More specifically, opening 22 is so sized as to prevent beams 15 and 16 from impinging on portions of strip 3 close to the longitudinal edges of the strip, while the shape, size and location of screen 31 are so selected as to prevent beams 15 and 16 from Impinging on portions of strip 3 close to longitudinal center line 5.

As shown in FIGS. 2 and 3, plate 4 presents a transversely-concave longitudinal seat 36 for guiding and supporting strip 3, and having, in cross section, a curved, more specifically, elliptical contour for the reasons explained later on.

In actual use, source 8 is activated at regular time intervals, corresponding to the passage of joints 6a past focusing head 9, for generating a pulsed laser beam 7 of given frequency depending, for example, on the rotation speed of prism 12. Beam 7 is divided into beams 15 and 16 by mirror 30, and focused by lenses 28 on to strip 3 sliding inside seat 36.

Element 25 fitted with mirror 30 and lenses 28 is rotated by motor 27 anticlockwise (in FIGS. 2 and 3) and at constant speed about axis 17. Beams 15 and 16 are thus rotated about axis 17, so as to issue solely through opening 22 defining the size of sectors 18 and 19, whereas, for the remainder of each revolution, they are intercepted by lateral wall 20a of focusing head 9. The beams issuing from opening 22 sweep over respective sectors 18 and 19 in planes "a" and "b", the slope of which in relation to direction 3a depends on both the linear velocity of the focal points of beams 15 and 16, and on the traveling speed of strip 3, and is such as to enable the focal points of the beams to travel, on strip 3, along respective straight paths 37 parallel to and located symmetrically on either side of transverse joints 6a. By virtue of the size of opening 22, paths 37 are arrested short of the opposite lateral edges of strip 3, and present a central interruption over center line 5 produced by beams 15 and 16 being intercepted at this point by respective portions 34 and 35 of screen 31. Being pulsed, beams 15 and 16 produce on strip 3 respective series of holes 38 formed along respective paths 37 and the distance of which from both the lateral edges and center line 5 of strip 3 is always greater than a given minimum distance defined by the size of opening 22 and the width of screen 31. As such, the distance between holes 38 and the lateral edges of the strips formed by cutting strip 3 along center line 5 will always be greater than said given minimum distance.

When source 8 is activated, for each complete turn of shaft 26, each beam 15, 16 forms through strip 3 a series of holes 38 aligned along respective path 37, and the distribution of which along strip 3 may thus be adjusted as required by regulating source 8 accordingly.

As the air intake, for a given vacuum, of ventilated cigarettes depends largely, not only on the size and number, but also on the shape of the ventilation holes, and the flexural resistance of the cigarette is directly proportional to the roundness of the holes, it therefore follows that holes 38 formed in strip 3 must be made as round and as similar to each other as possible.

For this purpose, the angle at which beams 15, 16 impinge on strip 3 at each hole 38 is maintained substantially equal to 90° by so forming seat 36 that its surface is an axial surface portion of an ellipsoid of translation having its axis parallel to center line 5, and the intersection of which with each of planes "a" and "b" is a circle.

We claim:

1. A device (1) for perforating cigarette wrapping material (2) comprising:
    a source (8) for emitting at least one pulsed laser beam (7);
    supporting means (4) defining a path along which the wrapping material (2), in the form of a continuous strip (3), is adapted to be fed at a predetermined traveling speed and in a predetermined direction (3a);
    a focusing head (9) for receiving said pulsed laser beam (7) from said source (8) and focusing it on said strip (3);
    said focusing head (9) comprising movable focusing means (28) for focusing the laser beam (7) in at least one plane (a, b) intersecting said path along a line slanting in relation to the traveling direction (3a) of the strip (3);
    drive means (27) connected to said focusing means (28), for moving the beam (7) in said plane (a, b); and
    shutter means (31a) for enabling the beam (7) to sweep, in said plane (a, b), over a sector (18, 19) of predetermined shape and size and extending over a given portion of said line,
    said focusing means (28) being fitted to said focusing head (9) so as to rotate, by virtue of said drive means (27), about an axis (17) perpendicular to said plane (a, b).

2. A device as claimed in claim 1, wherein said shutter means (31a) comprises an annular wall (20a) made of material impervious to the laser beam, extending about said axis (17), and having an opening (22) for said beam (7); said opening (22) defining the size of said sector (18, 19).

3. A device as claimed in claim 2, wherein said shutter means (31a) further comprises a screen (31) made of material impervious to the laser beam and located across said opening (22) and parallel to said axis (17); said screen (31) intercepting the beam (7), focused by said focusing means (28), along at least a portion (32; 33) of a given angle of said sector (18, 19).

4. A device as claimed in claim 1, wherein said focusing means (28) provides for focusing on said strip (3) first and second laser beams (15, 16) parallel to each other; said drive means (27) rotating said beams (15, 16) about said axis (17) in respective first and second said planes (a, b) parallel to each other, slanting in relation to the traveling direction (3a) of said strip (3), and separated from each other in said direction (3a).

5. A device as claimed in claim 1, wherein said supporting means (4) comprises a plate (4) having a longitudinal seat (36) for guiding and supporting said strip (3); said seat (36) being transversely concave and having, in cross section, a curved profile.

6. A device as claimed in claim 5, wherein said seat (36) presents an elliptical transverse profile.

7. A device as claimed in claim 6, wherein said seat (36) is so formed that its surface is an axial surface portion of an ellipsoid of translation having its axis parallel to the traveling direction (3a) of said strip (3), and the intersection of which with said plane (a, b) is a circle.

* * * * *